United States Patent
Gurley et al.

(10) Patent No.: US 7,352,406 B2
(45) Date of Patent: Apr. 1, 2008

(54) SIGNAL ACQUISITION FOLLOWING TRANSIENT SIGNAL INTERRUPTION

(75) Inventors: Thomas David Gurley, Indianapolis, IN (US); Mark Alan Nierzwick, Brownsburg, IN (US); Daniel Lee Reneau, Fishers, IN (US)

(73) Assignee: Thomson Licensing, Boulogne Billancourt (FR)

( * ) Notice: Subject to any disclaimer, the term of this patent is extended or adjusted under 35 U.S.C. 154(b) by 552 days.

(21) Appl. No.: 10/213,935

(22) Filed: Aug. 7, 2002

(65) Prior Publication Data

US 2004/0027483 A1 Feb. 12, 2004

(51) Int. Cl.
*H04N 5/08* (2006.01)
(52) U.S. Cl. ......................... 348/528; 348/532; 348/534
(58) Field of Classification Search ................. 348/678, 348/682, 683, 684, 689, 690, 691, 694, 695, 348/696, 525, 528, 532, 534
See application file for complete search history.

(56) References Cited

U.S. PATENT DOCUMENTS

| | | | |
|---|---|---|---|
| 4,064,541 A | * | 12/1977 | Schneider et al. .......... 348/532 |
| 4,148,068 A | | 4/1979 | Hofmann |
| 4,292,598 A | * | 9/1981 | Yasumura .................... 330/281 |
| 4,677,388 A | | 6/1987 | Morrison |
| 4,707,740 A | * | 11/1987 | Stratton ....................... 348/532 |
| 5,210,606 A | * | 5/1993 | Lagoni et al. .............. 348/533 |
| 5,379,075 A | * | 1/1995 | Nagasawa et al. .......... 348/678 |
| 5,633,927 A | * | 5/1997 | Ryan et al. .................. 380/204 |
| 5,953,069 A | | 9/1999 | Bruins et al. |

FOREIGN PATENT DOCUMENTS

| | | |
|---|---|---|
| EP | 0 716 539 A2 | 6/1996 |
| JP | 5-292340 | 11/1993 |
| JP | 62-68370 | 9/1994 |
| JP | 7-75065 | 3/1995 |
| JP | 2000-209459 | 7/2000 |

\* cited by examiner

*Primary Examiner*—Michael H. Lee
(74) *Attorney, Agent, or Firm*—Joseph J. Laks; Robert D. Shedd; William A. Lagoni

(57) ABSTRACT

A television monitor display with video signal processing comprises a source (SM) of a video display signal (Y) including a sync component (S). A video processor (U1) is coupled to process the video display signal (Y). A sync separator (SS) is coupled to generate separated synchronizing signals (Sy) from the sync component (S) of the video display signal (Y). A video amplifier (100) is coupled to the sync separator (SS) and the video processor (U1) and generates an output video signal (Ys+) wherein a sync component (S+) of the output video signal is increased in amplitude in accordance with the separate synchronizing signals (Sy) coupled to the video amplifier (100).

7 Claims, 1 Drawing Sheet

SIGNAL ACQUISITION FOLLOWING TRANSIENT SIGNAL INTERRUPTION

This invention relates to television receiver monitor operable to display either standard or high definition images, and in particular to synchronization following a transient signal interruption.

BACKGROUND OF THE INVENTION

A television receiver monitor can accept video input signals of standard definition, having horizontal scanning frequency of 15.734 KHz (1H) or signals of higher definition with a higher scanning frequency of nominally 2.14H or about 33.6 KHz. Standard definition, SD or 1H input signals are processed to enable display at a double scanning frequency of 2H. Higher definition input signals with horizontal scanning frequencies of slightly greater than 2H are processed by analog circuits and then displayed. In an exemplary receiver monitor because the display operates with a scanning frequency in the order of double the standard definition rate, standard definition signals require up conversion to form a 2H or double frequency scan rate prior to display. Typically standard definition signals are encoded with color information according to the NTSC standard thus prior to up conversion it is necessary decode the NTSC signal into its luminance and color components which are then digitized to form a digital signal bit stream. Typically this 1H digital bit stream is processed by a de-interlacer, which de-interlaces or up converts the bit stream from 1H to a 2H scanning frequency. The resulting double frequency signal is digital to analog converted to form an analog 2H signal for subsequent analog processing and display.

Prior to the analog to digital converter or (ADC) processing the input signals are subject to automatic gain control, AGC, which ensures that a substantially constant amplitude signal is provided for digital conversion. This AGC system monitors the sync pulse amplitude of the luminance signal coupled for digitization to determine the degree of correction required. For example, if the incoming sync is too large or small, the AGC system assumes that the video signal originated with a standard video to sync ratio, and decreases or increases the overall signal gain to restore a standard sync amplitude. This system works fairly well except in cases where the video to sync ratio is significantly different from the nominal ratio of 2.5:1 (100/40 IRE).

SUMMARY OF THE INVENTION

In a first advantageous arrangement synchronizing pulses present on the luminance or Y signal coupled for sync separation are stretched or increased in amplitude to improved sync separation. However, this increase in sync pulse amplitude removes the video to sync amplitude ratio which originated from the broadcast source. Thus in a second advantageous arrangement the stretched sync pulses are clipped to establish a fixed, nominally standard sync level for feeding to the video AGC circuitry. However, during transient signal interruptions occurring for example;
during normal channel changes,
due to channel changes whilst viewing an electronic program guide,
when using a cable box for tuning,
during auto channel search, and channel or input source selection of a video signal containing varying, low frequency, high average picture level (APL) content, or signals with vertical rate black to white transitions, for example, as produced by a televised film leader.

During transient signal interruptions such as described above, new signal acquisition is improved by utilizing a third advantageous arrangement which defeats the sync clipper, and supplies the sync separator and decoder with a larger than standard sync pulse amplitude which enhances sync separation. A further improvement in signal acquisition is achieved by use of AGC circuitry which temporarily reduces video gain to improve the signal handling capability of video processing circuitry subject to low frequency, high average picture level video content.

BRIEF DESCRIPTIONS OF THE DRAWINGS

DETAILED DESCRIPTION

Figure 1:
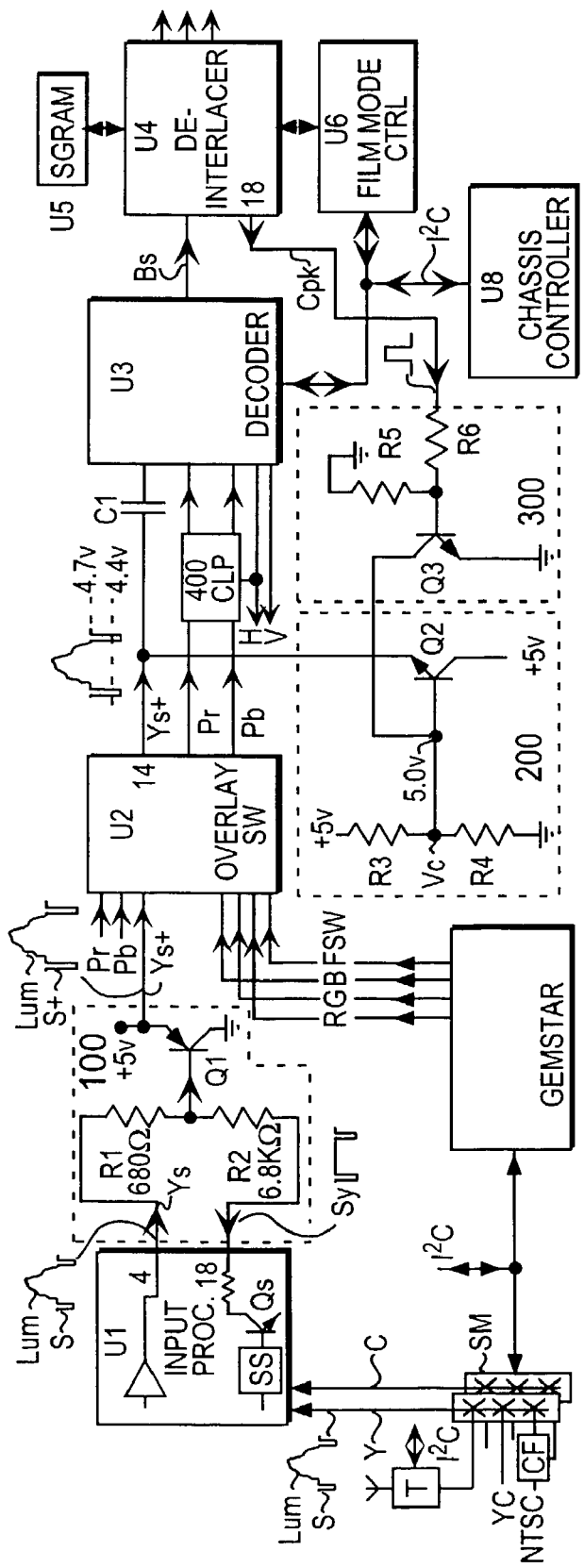
FIG. 1 is a simplified block schematic diagram showing various inventive arrangements in a receiver monitor display.

FIG. 1, presents a block schematic diagram of a receiver monitor display with scanning frequency up conversion. The display can accept various video input signals of either standard or high definition with a nominal scanning frequency of 1H or nominally 2H where the SD or 1H input signals are processed to enable display at a double frequency rate. Standard definition signals are input to video processor integrated circuit U1, for example Toshiba type TA1286NF, via a selector matrix with allows user selection from various sources, for example, a demodulated RF signal or IF signal, an external Y C component signal comprising luminance and encoded subcarrier, or NTSC encoded signals. The external composite NTSC signal is initially comb filtered (CF) to produce separated luminance and encoded subcarrier prior to coupling to selector matrix (SM). Thus the standard definition (SD) input to video processor U1 is in the form of luminance and encoded subcarrier components known as YC. Video processor U1 includes a sync separator SS, and an NTSC decoder and matrix arrangement which decodes and forms color difference signals for example R-Y, and B-Y or Pr and Pb. The luminance or Y signal input is coupled via sync separator SS which provides separated (1H) sync pulses at pin 18 of IC U1. The luminance signal Y, with sync pulses, is output at pin 4 and coupled via an advantageous gated sync pulse stretcher, which will be described, to an overlay switch or matrix switch integrated circuit U2, for example Toshiba type TA1287F.

Video guide information is generated by a Gemstar™ circuit module and is coupled as red, green and blue video signals together with a fast switch signal, (FSW), for processing as an on screen display (OSD) by overlay switch IC U2, prior to up-conversion. The switching or mixed superimposition of the Gemstar™ OSD signals is accomplished by IC U2, which in addition also provides a matrix that converts the GemStar™ originated red, green and blue on screen display signals to luminance and color difference components, for example Y R-Y B-Y, Y Pr Pb, YUV or YIQ.

The outputs from overlay switch integrated circuit U2 are coupled via further advantageous circuitry depicted in blocks 200, 300 and 400, which will be described, to a digital decoder, IC U3, for example Samsung type KS0127B. Integrated circuit U3 digitizes the luminance and coloring signals received from overlay switch U2 and forms a data stream conforming to CCIR standard 656. In this display system the master source of horizontal and vertical sync signals is chosen to be sync signals extracted from the luminance signal input to digital decoder U3.

The digitized component signal bit stream (Bs) is coupled to a de-interlacer system comprising a de-intertacing integrated circuit U4, for example Genesis Micro type gmVLX1A-X, and a film mode controller IC U6, for example Genesis Micro type gmAFMC. Integrated circuit U6 is controlled by and communicates with chassis controller U8 via an I²C bus, however communication between IC U4 and IC U6 is via a separate data bus. De-interlacing is initiated within IC U4 which examines the incoming component video data stream to determine the best method for constructing interpolated lines prior to storing each field in a 32 bit SGRAM memory IC U5, for example AMIC type A45L9332. If motion is not detected, the system repeats information from the previous field to provide a complete frame of non-moving video. However, if motion is detected, verticat/temporal filtering is applied using lines and fields around the interpolated line to provide an interpolated signal essentially free of motion artifacts. Film mode controller IC, U6 detects the presence of video signals which originated from 24 Hz film by monitoring motion artifacts for the presence of a cyclical variation occurring at a 5 field rate. This multi field repetition rate results from a so called 3:2 pull-down telecine process used produce a nominal display field rate of 60 Hz by the cyclical duplication of 48 original field derived from a 24 frame per second film original. Thus, having detected film original material the interpolated signal can be assembled with temporally correct lines from a previous field. The resulting 2H scan rate digital video, in the form of three, 8 bit data streams (Y, Pr and Pb) are output from de-interlacing IC U4 and coupled for digital to analog conversion and analog signal processing prior to subsequent display.

User display signal selections produce transient signal interruptions which can result in synchronization problems in decoder IC U3. For example, signal interruptions result during normal channel changes, or as a consequence of channel changes during program guide operation. Longer duration signal interruptions can result when using a cable box for tuning (channel selection) or during auto channel search. Yet another cause of signal loss occurs when selecting between input sources, and in particular when the wanted signal includes pictures varying at a low frequency rate between high and low average picture levels or APLs. Such a variation in average picture level results from signals with vertical frequency black to white transitions, for example, as produced by a televised film leader. Further interruptions can result with signals originating from a VCR replay which frequently have a sync signals of reduced amplitudes. Thus, because the decoder integrated circuit U3 is designated as the master sync signal source, the various advantageous arrangements, 100, 200, 300 depicted in FIG. 1 are employed to provide reliable, robust sync separator performance.

In the advantageous arrangement of block 100, of FIG. 1, the amplitude of synchronizing pulses (S) present on the luminance signal (Lum) output from input processor U1 are stretched or increased in amplitude. As described previously input processor IC U1 includes a sync separator (SS) which derives sync pulses from the luminance signal input and provides a sync output (Sy) at pin 18. These input derived sync pulses (Sy) are advantageously used to increase the luminance sync pulse (S+) amplitude which consequently improves the performance of subsequent sync separators, for example as included within integrated circuit U3. The inventive sync amplitude stretcher operates as follows. The separated sync pulses from separator SS are coupled to an NPN transistor Qs which connected with an open collector arrangement via an internal resistor to provide a current sink at pin 18 of U1. The luminance signal (Lum) is linearly processed within integrated circuit U1 and forms an output (Ys) at pin 4 which is coupled via external series connected resistors R1 and R2 back to integrated circuit U1 pin 18. The junction of resistors R1 and R2 is connected to the base of PNP emitter follower transistor Q1 which provides the processed output signal (Ys+).

During the period of each sync pulse (S) transistor Qs is saturated and consequently draws current from luminance signal (Ys) output at pin 4. Thus, each separated input signal sync pulse (Sy) causes a sync responsive current to flow via pin 18. This sync related current causes a sync pulse voltage to be developed across series resistors R1 and R2 which is substantially coincident with, and adds to the sync signal component (S) present on the luminance signal (Ys) at output pin 4. Thus by advantageously gating during the sync pulse period, the sync pulse component (S) of the luminance signal at the junction of resistors R1 and R2 is increased in amplitude. During the remainder of each horizontal interval sync signals are absent from pin 18, thus the collector terminal of transistor Qs presents a high impedance allowing the luminance signal (Ys+) from junction of resistors R1 and R2, with sync amplitude alteration in to be coupled to the base of a PNP emitter follower Q1 without any significant amplitude. Emitter follower Q1 couples the luminance signal Ys+ with increased amplitude sync pulses to overlay switch U2 which operates as described previously. The amount of sync stretch or amplitude alteration is dependent on the values of resistors R1 and R2.

Although this increase in sync pulse amplitude insures reliable sync separation for signals deficient in sync amplitude, the ratio of luminance to sync amplitudes, which originated from the broadcast source is lost. Thus, in a second advantageous arrangement the stretched sync pulses are amplitude clipped, as depicted in block 200 of FIG. 1. Following processing by overlay switch U2 the luminance signal Ys+, with stretched syncs is output from IC U2 at pin 14 and clipped by inventive block 200 to establish a fixed, nominally standard sync level prior to coupling via capacitor Cl to video AGC circuitry within IC U3. In addition the clipping action of block 200 prevents excess sync amplitude compensation when nominally standard signals are processed by gated sync stretcher 100.

Within overlay switch U2 the luminance signal Y+ is clamped during the back porch interval to a voltage of about 4.7 volts prior to being output at pin 14. Thus clipping action can be provided at pin 14 by an emitter electrode of transistor Q2 which removes sync amplitude in excess of the nominally standard value. Hence, with the back porch interval of the output luminance signal clamped at 4.7 volts, a standard amplitude sync tip should occur at a voltage of about 4.4 volts (4.7-0.286 volts). Since circuit block 100 increased sync amplitude, the resulting stretched sync tip can be located in a voltage range of 4.3 to 4.35 volts. In clipper block 200, a clipping voltage Vc is generated by a resistive potential divider formed by resistors R3 and R4 and is coupled to the base of clipping transistor Q2. The emitter of transistor Q2 is connected to the junction of overlay switch U2 output pin 14 and capacitor C1. Sync clipping occurs when sync pulses at the emitter of transistor Q2 have a potential one Vbe (base emitter voltage) below the clipping voltage at the base of transistor Q2. The clipping voltage can be determined by fixed resistors or may be adjustable to provide any desired sync amplitude. However, to provide a nominal sync amplitude of 0.286 volts, the resultant clipped sync tip is required to be at about 4.41 volts (4.5-0.286). Thus for nominal sync amplitude a clipping voltage of 5.06 volts is required at the base of transistor Q2, and this voltage represents the nominal sync tip voltage plus the Vbe of transistor Q2. Thus sync clipper 200 conforms all 1H sync signals to a nominally standardized amplitude thereby facilitating reliable sync separation and largely prevents undesirable video amplitude variation resulting from sync controlled automatic gain control (AGC) performed in a subsequent processing stage.

During transient signal interruptions such as those described, new signal acquisition is improved by a third advantageous arrangement, depicted in block 300 of FIG. 1, which inhibits sync clipper 200. The inhibit circuit of block 300 is coupled to sync clipping transistor Q2 which is controllably inhibited, thereby allowing stretched sync pulses to be supplied decoder IC U2 during transient signal interruptions. In block 300 switch transistor Q3 is turned on by a positive control signal clip kill, Cpk, coupled to the transistor base via a resistive potential divider formed by resistors R5 and R6. With transistor Q3 turned on the base of sync clipping transistor Q2 is held close to the saturated collector potential of transistor Q3 and thus prevents clipping at the emitter of transistor Q2. During normal operation, switch or inhibit transistor Q3 is turned off by signal, Cpk, having a nominally ground potential coupled via the resistive divider. Control signal Cpk is demultiplexed from the I²C bus by IC U4 and output on a general purpose I/O pin, 18. During the exemplary signal interruptions discussed previously, chassis controller U8 detects an oscillator unlock and outputs the clip kill instruction via the I²C bus. This instruction inhibits sync clipper 200 and allows the sync separator and decoder to be supplied with increased amplitude sync pulses (Ys+). These stretched sync pulses enhance sync separation and in addition, cause the AGC circuitry to reduce video gain thereby substantially eliminating video processing instability resulting from varying, high average picture level signals. Hence during the selection of new display sources the time for the system to acquire and display is reduced and unwanted transitory display artifacts are largely prevented.

Tuning, or a channel change during the display of an electronic program guide can result in a similar visual disturbance. During such guide tuning the overlay switch control line, FSW, from the GEMSTAR™ module is momentarily over ridden causing the overlay switch (IC U2) to select the newly chosen signal source for coupling to decoder IC U3 to facilitate sync separation which allows the sync system to lock to the new signal. Following this brief period of sync acquisition, overlay switch IC U2 is switched back to display the guide signals (RGB) coupled for on screen display (OSD). This toggling of the guide OSD within overlay switch U2 causes a flash as the display signal changed then reselected. The visibility of this switching artifact is also dependent on the video content of the display background. However, by inhibiting stretched sync clipping, during signal source switching the advantageously increased sync amplitude provides a corresponding reduction in video signal amplitude due to AGC action which significantly reduces the visibility of picture disturbance upon guide reselection.

Figure 2:
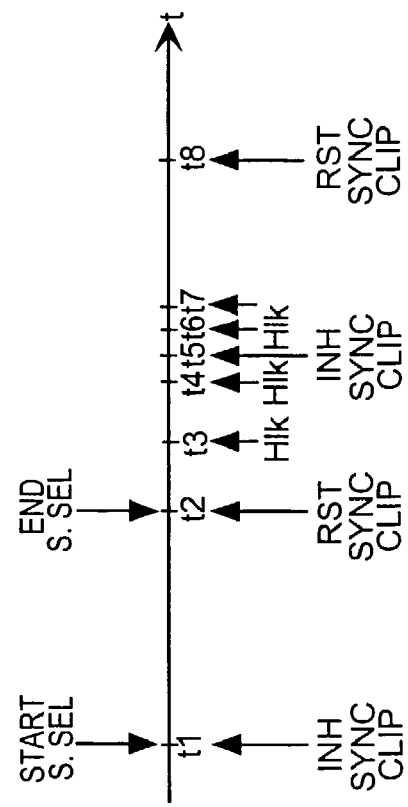
FIG. 2 represents a sequence of monitoring and control actions occurring at and subsequent to signal source selection in the inventive arrangements depicted in FIG. 1.

A time line depicting a tuning sequence with a tuner resident within the receiver monitor is shown in FIG. 2. Tuning is initiated by an I²C bus instruction, for example start signal selection, (START S. SEL) generated by the chassis micro controller, for example U8, in response to a user command. Following the commencement of tuning, a further bus command (INH. SYNC CLIP) is output via bus and is decoded by decoder IC U3 causing block 300 to inhibit sync clipper 200. These two bus instructions are generated sequentially starting at time t1. When, at time t2, the tuner acquires the newly selected transmission an end of signal selection (END S. SEL) message is generated by the tuner and sent via the bus to chassis controller U8. Following receipt of the tuning completion signal (END S. SEL) controller U8 outputs a bus command which removes the inhibit and restores sync clipping (RST. SYNC CLIP) by circuit block 200.

Following the signaled acquisition of the new signal source at time t2 chassis controller U8 polls decoder IC U3 and requests the status of an horizontal lock bit in a status register of IC U3. The H-lock bit indicates synchronization between a line (H) locked clock generator within IC U3 and the horizontal sync waveform from the newly selected source. During acquisition of the new input waveform by the line locked clock generator the horizontal lock bit is set to digital zero (0), when lock is achieved the bit is changed to a digital 1. Thus at time t3, about 100 mille seconds after completing the channel change the chassis controller polls the decoder status H-lock bit to check for successful acquisition or to detect clock generator instabilities, for example, resulting from a changed average picture level (APL) present in the new signal source. If the status bit indicates a locked condition no corrective control instructions are output from controller U8. However, if the status bit H-lock indicates an unlocked or unstable condition, controller U8 outputs a second poll at time t4, about 100 mille seconds after t3, and if decoder IC U3 signals a continued unlock condition the chassis controller issues a sync clip inhibit instruction at time t5, which as has been explained, increases the sync pulse amplitude and reduces the video amplitude within decoder IC U3. At repeated times t6, t7 and t8 controller U8 polls the status bit from decoder U3 and maintains sync clipper 200 in an inhibited condition. At exemplary time t8 polling of the status bit H-lock indicates a locked condition whereupon sync clipping is restored by I²C bus instruction RST SYNC CLIP which removes the inhibit from sync clipper 200. Conditions resulting in the exemplary unlocked period t3 to t8 can occur from selection of signals with video content containing large amplitude, vertical rate, black to white transitions. Examples of such video signals are a monoscope pattern or telecine film leader which can yield a low frequency signal with large APL changes. Such a signal can result in improper vertical processing in decoder IC U3, resulting in the generation of spurious vertical pulses and mis-timed horizontal sync and clamp pulses, which in turn, grossly perturb the displayed picture. Such APL derived synchronization failures result in a visual display artifact that can produce a sustained, possibly regenerative condition.

When an external cable box is used for channel selection the exact tuning time is not known because acquisition is not signaled, hence the display is blanked for the maximum tuning time specified by the cable box manufacturer, for example 7.5 seconds. In addition to blanking the display the sync clipper is inhibited during the same interval to insure a smooth display transition without any undesirable display artifacts. Thus the sequence of control events in FIG. 2 is essentially the same as with an internal tuner however the time interval between times t1 and t2 is a fixed maximum value, unlike the shorter period resulting from signaled acquisition by the resident tuner.

The channel search or auto tune condition can be considered a very long tune, and hence for the same reasons discussed previously the sync clipper is inhibited. By defeating the sync clipper, a large sync signal is supplied to the decoder which allows the sync separator to distinguish the vertical sync signal from vertical rate, low frequency APL variations and thus facilitate decoder locking and recovery.

What is claimed is:

1. A television monitor display with video signal processing, comprising:
   a source of a video display signal with a sync pulse component;
   a video processor coupled to process said video display signal and form an output signal with said sync pulse component increased in amplitude relative to other components of said video display signal;
   a sync amplitude clipper coupled to said video processor and clipping said increased amplitude sync pulses to a predetermined value;
   a controller coupled to provide one of enabled and disabled operation of said sync amplitude clipper, wherein said controller enables clipping to form said output signal with said predetermined amplitude value, and wherein said controller disables clipping and allows said output signal to retain said increased sync pulse amplitude component.

2. The television monitor display of claim 1, wherein only said sync pulse component of said output signal is clipped by said sync amplitude clipper.

3. The television monitor display of claim 1, wherein said controller disables operation of said sync amplitude clipper when changing said video display signal source.

4. The television monitor display of claim 1, wherein said controller disables operation of said sync amplitude clipper responsive to an unlocked condition identified via a data bus.

5. The television monitor display of claim 1, comprising an automatic gain control circuit for controlling an amplitude of said output signal responsive to an amplitude of said sync pulse amplitude component present in said output signal.

6. The television monitor display of claim 5, wherein said automatic gain control circuit reduces said amplitude of said output signal in accordance with said disabled operation of said sync amplitude clipper.

7. The television monitor display of claim 5, wherein said automatic gain control circuit reduces said amplitude of said output signal when changing said video display signal source.

* * * * *